United States Patent
Elwin

(10) Patent No.: US 6,758,395 B2
(45) Date of Patent: Jul. 6, 2004

(54) SELF-SERVICE TERMINAL

(75) Inventor: David Elwin, Angus (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/455,290

(22) Filed: Jun. 5, 2003

(65) Prior Publication Data

US 2003/0226890 A1 Dec. 11, 2003

(30) Foreign Application Priority Data

Jun. 8, 2002 (GB) .............................. 0213184

(51) Int. Cl.[7] .............................................. G06F 17/60
(52) U.S. Cl. ...................... 235/379; 235/381; 705/43; 705/45
(58) Field of Search ................ 235/381, 379; 705/43, 45

(56) References Cited

U.S. PATENT DOCUMENTS

| 4,253,016 | A | | 2/1981 | Hirose | |
|---|---|---|---|---|---|
| 4,349,111 | A | * | 9/1982 | Shah et al. | 209/534 |
| 5,386,103 | A | * | 1/1995 | DeBan et al. | 235/379 |
| 5,897,625 | A | * | 4/1999 | Gustin et al. | 705/43 |
| 6,196,457 | B1 | * | 3/2001 | Patterson | 235/379 |
| 6,454,163 | B2 | * | 9/2002 | Peebles et al. | 235/379 |
| 6,516,998 | B2 | * | 2/2003 | Calder et al. | 235/381 |
| 2002/0152164 | A1 | * | 10/2002 | Dutta et al. | 705/43 |

FOREIGN PATENT DOCUMENTS

GB          2 161 145 A           1/1986

* cited by examiner

Primary Examiner—Thien M. Le
Assistant Examiner—Uyen-Chau N. Le
(74) Attorney, Agent, or Firm—Michael Chan

(57) ABSTRACT

A self-service terminal (10) comprising a fascia (12) having a document entry/exit slot (56), and a document processing module (60) for processing documents entered via the slot (56) is described. The terminal (10) includes a document transport mechanism (70) for transporting documents between the slot (56) and a processing zone (72 or 74 or 76), and the transport mechanism (70) includes a chute (88) leading to a dispense area (58), so that if a document is to be returned to the user, the transport mechanism (70) attempts firstly to return the document via the slot (56), and if that fails, the transport mechanism (70) deposits the document into the chute (88) to return the document to the user via the dispense area (58). The terminal may be a check cashing ATM.

18 Claims, 5 Drawing Sheets

SELF-SERVICE TERMINAL

BACKGROUND OF THE INVENTION

The present invention relates to a self-service terminal (SST), such as an automated teller machine (ATM). In particular, the invention relates to an SST for cashing checks, such as a check cashing ATM.

A check cashing ATM allows a registered user, who typically does not have a bank account, to cash a check and receive money from the ATM in a public access, unattended environment. A user typically registers with an institution that owns or operates check cashing ATMs, and provides identification information (such as a social security number) and information about a check (usually a pay check) that he/she regularly receives. The registered user is typically provided with a card to initiate a check cashing transaction at a check cashing ATM.

The check information typically includes details of how frequently a check is paid (for example, every week), who the check is paid by (that is, the payor of the check), the payor's bank details (for example, a bank code identifying the name of the bank), the typical amount that the check is made out for, and such like.

To cash a check, a user enters his/her card at a check cashing ATM, then enters a check to be cashed through a check slot in the ATM's fascia. The ATM draws in and processes this check. If the check is valid, and the details printed on the check match the check information provided during registration, then the ATM informs the user of a surcharge that will be applied if the user wishes to cash the check.

If the user agrees to the surcharge then cash is dispensed to the user and the check is stored within the ATM. If the user does not agree to the surcharge then the check is returned to the user via the check slot.

The check may be returned to the user for other reasons, for example, if the check is not complete, if the check has not been endorsed by the user, if the ATM decides that the details printed on the check do not match the check information provided by the user during registration, and such like.

One problem associated with check cashing ATMs relates to the condition of the checks that are presented for cashing. It is difficult for an ATM to transport checks that have defects such as large tears, holes, creases, folds, dog-ears, and such like. A substantial percentage of checks entered at a check cashing ATM include one or more of these defects.

For some defects, such as folds, an ATM may be able to draw in a check, but may not be able to return the check to the user because the fold prevents the check from being transported in the reverse direction.

For check deposit ATMs, where the user has a bank account, a check that can be drawn in but not returned is usually deposited in a reject bin for manual processing at some later time. However, this option is not acceptable for a check cashing ATM because the user does not have an account to which the value of the check can be credited. Even if a temporary account is created and the value of the check is subsequently credited to this temporary account, this is still unsatisfactory because the user typically needs the money immediately as it is the user's pay.

To overcome this problem, it is conventional for a maintenance engineer to be called to return the check to the user. This is expensive for the owner of the ATM, and time consuming for the user who has to wait for his/her check to be returned. This also causes the ATM to go out of service until the maintenance engineer has arrived, and may give rise to security implications.

SUMMARY OF THE INVENTION

It is among the objects of an embodiment of the present invention to obviate or mitigate the above disadvantage or other disadvantages of prior art self-service terminals.

According to a first aspect of the present invention there is provided a self-service terminal comprising a fascia having a document entry/exit slot, and a document processing module for processing documents entered via the slot; where the terminal includes a document transport mechanism for transporting documents between the slot and a processing zone, and the transport mechanism includes a chute leading to a dispense area, so that if a document is to be returned to the user, the transport mechanism attempts firstly to return the document via the slot, and if that fails, the transport mechanism deposits the document into the chute to return the document to the user via the dispense area.

Preferably, the entry/exit slot is located above the dispense area.

The processing zone may include a MICR (magnetic ink character recognition) reader and/or one or more imagers and/or a printer.

Preferably, access to the dispense area by a user is controlled by a shutter, where the shutter is opened by the SST to allow a user to retrieve a returned document. This enables the SST to restrict access to the document, which may be useful if the user does not retrieve a document because the SST can stop third parties from retrieving the document once the user has left the vicinity of the SST.

In one embodiment, the chute may include a purge mechanism for purging a document from the dispense area to a purge bin in the event of the document not being retrieved by a user. The purge mechanism may be implemented by a trap door in the chute through which a document may fall from the dispense area to the purge bin; alternatively, the chute may pivot to deposit a document into the purge bin. Any other convenient purge mechanism may be used.

By virtue of this aspect of the invention, a SST is provided that can return a document to a user by using a chute to guide the document to a dispense area under the action of the force of gravity, thereby reducing service calls to the SST.

According to a second aspect of the present invention there is provided a self-service terminal including a document processing module for receiving documents inserted by a user, characterized in that the module is operable to return a document to the user without changing direction of transport of the document.

Preferably, the document may be returned to a user via an entrance/exit slot through which the document was originally inserted. This has the advantage that the user receives the document through the same slot that the document was inserted.

In a preferred embodiment, the document is delivered to the user via a chute, so that the document can be released by the document processing module and returned to the user under the action of gravity.

In some embodiments, the terminal initially attempts to return the document to the user via the entrance/exit slot, but if this is not possible, then the terminal attempts to return the document to the user via the chute.

Preferably, the terminal includes a display for presenting a screen to the user informing the user that the document is being returned via the chute.

Preferably, the terminal is a check cashing ATM.

According to a third aspect of the present invention there is provided a document processing module having an entrance port at an upper area of the module and an exit port at a lower area, the module including a document transport mechanism for transporting documents from the entrance port to a storage area, where the module includes a chute for delivering documents to the lower port, whereby any document that cannot be transported properly by the module may be returned to the user via the chute.

Preferably, the document processing module is a check processing module.

Preferably, the terminal is an ATM.

According to a fourth aspect of the present invention there is provided a method of returning documents to a user from a self-service terminal, the method comprising the steps of: providing a chute leading to a dispense area; delivering the document into the chute.

Preferably, the method includes the step of informing the user via a display that a document is being returned via the dispense area.

According to a fifth aspect of the present invention there is provided a method of cashing financial instruments, the method comprising the steps of: transporting a financial instrument from an entrance slot to a process zone; determining whether to accept or reject the instrument; in the event of accepting the instrument, dispensing cash; in the event of rejecting the instrument, returning the instrument to the user; where the step of returning the instrument to the user includes the step of dropping the instrument into a chute leading to a dispense area.

The financial instrument may be a check, money order, or such like.

According to a sixth aspect of the present invention there is provided a document processing module comprising a document transport mechanism, a document processing mechanism, and a plurality of document repositories, characterized in that one of the document repositories includes a chute leading to an open area through which the document can be removed, so that any document dropped into the chute is delivered to the open area for removal by a user.

It will be appreciated that the above aspect of the present invention has the advantage that a financial instrument is returned to a user by the force of gravity, thereby avoiding any transport problems associated with defects in the media substrate such as tears, folds, creases, and such like.

BRIEF DESCRIPTION OF THE DRAWINGS

These and other aspects of the present invention will be apparent from the following specific description, given by way of example, with reference to the accompanying drawings, in which.

DETAILED DESCRIPTION

Figure 1:
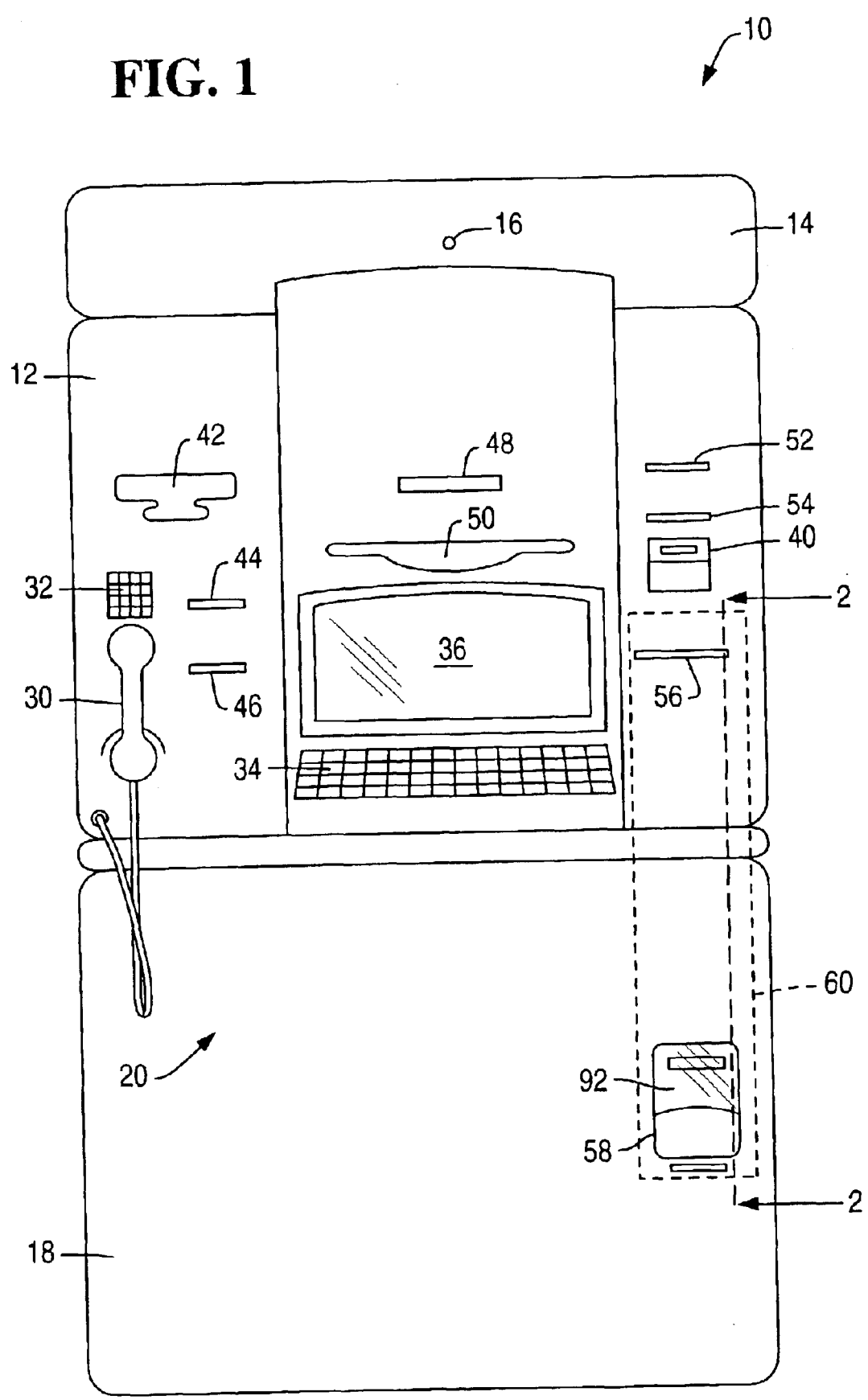
FIG. 1 is a pictorial diagram of a self-service terminal according to one embodiment of the present invention.

Reference is first made to FIG. 1, which illustrates a self-service terminal 10 in the form of a check cashing ATM. The ATM 10 comprises a fascia 12 pivotably coupled to a chassis (not shown); an upper panel 14 mounted to the chassis and defining an aperture 16 through which a camera (not shown) images a user of the ATM 10; and a lower panel 18 hingeably coupled to the chassis (not shown) so that the lower panel 18 can be opened to reveal a safe (not shown) mounted in the chassis (not shown).

When the lower panel 18 is open, the fascia 12 can be pivoted upwards to reveal ATM modules mounted within the chassis (not shown).

The fascia 12 and lower panel 18 provide a user interface 20 for allowing a user to execute a transaction. The fascia 12 includes a handset 30 and a telephone keypad 32 for allowing a user to contact a remote operator (not shown) typically located in a call center (not shown). The fascia 12 also includes an encrypting keyboard 34 for allowing a user to enter transaction details, and a display 36 for presenting screens to a user.

The fascia 12 also defines eight slots for receiving and dispensing media items, and a tray 40 into which coins can be dispensed. The slots include: a money order printer slot 42, a bunch note input slot 44, a bunch note exit slot 46, a statement output slot 48, a cash dispense slot 50, a card reader slot 52, a card issue slot 54, and a check input/output slot 56. The slots 42 to 56 and tray 40 are arranged so that when the fascia 12 is closed, the slots and tray align with corresponding ATM modules mounted within the ATM's chassis (not shown).

The user interface features described above are all provided on an NCR PERSONAS (trade mark) 5878 financial services center ATM, available from NCR Financial Solutions Group Limited, Discovery Center, 3 Fulton Road, Dundee, DD2 4SW, Scotland.

However, in this embodiment of the invention an NCR PERSONAS (trade mark) 5878 ATM has been modified to include a lower dispense area 58. The dispense area 58 is located beneath the check input/output slot 56 and is fed by a check processing module 60 located within the ATM chassis (not shown).

Figure 2:
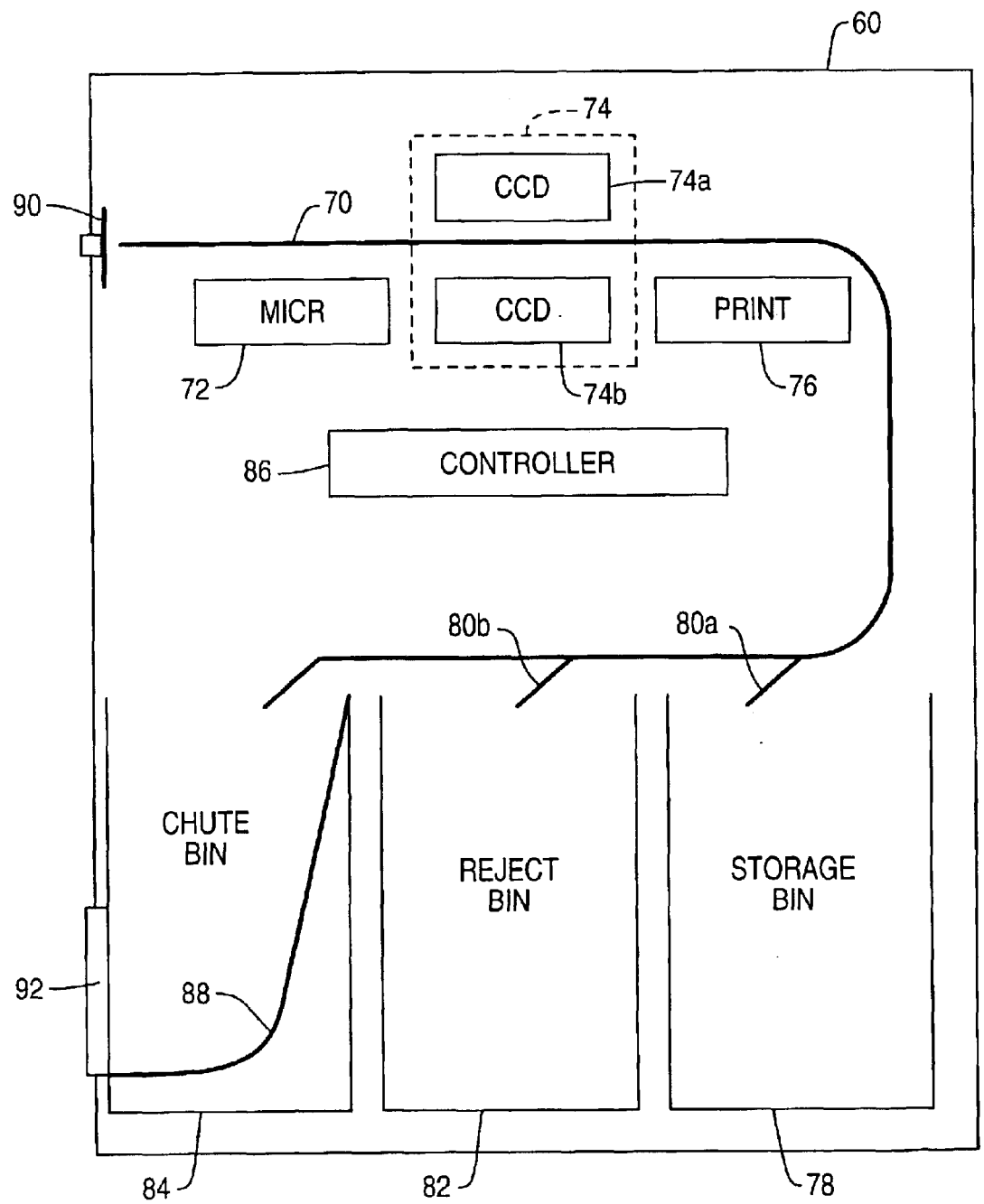
FIG. 2 is a simplified schematic sectional diagram showing a part (the check processing module) of the terminal of FIG. 1.
Figure 3:
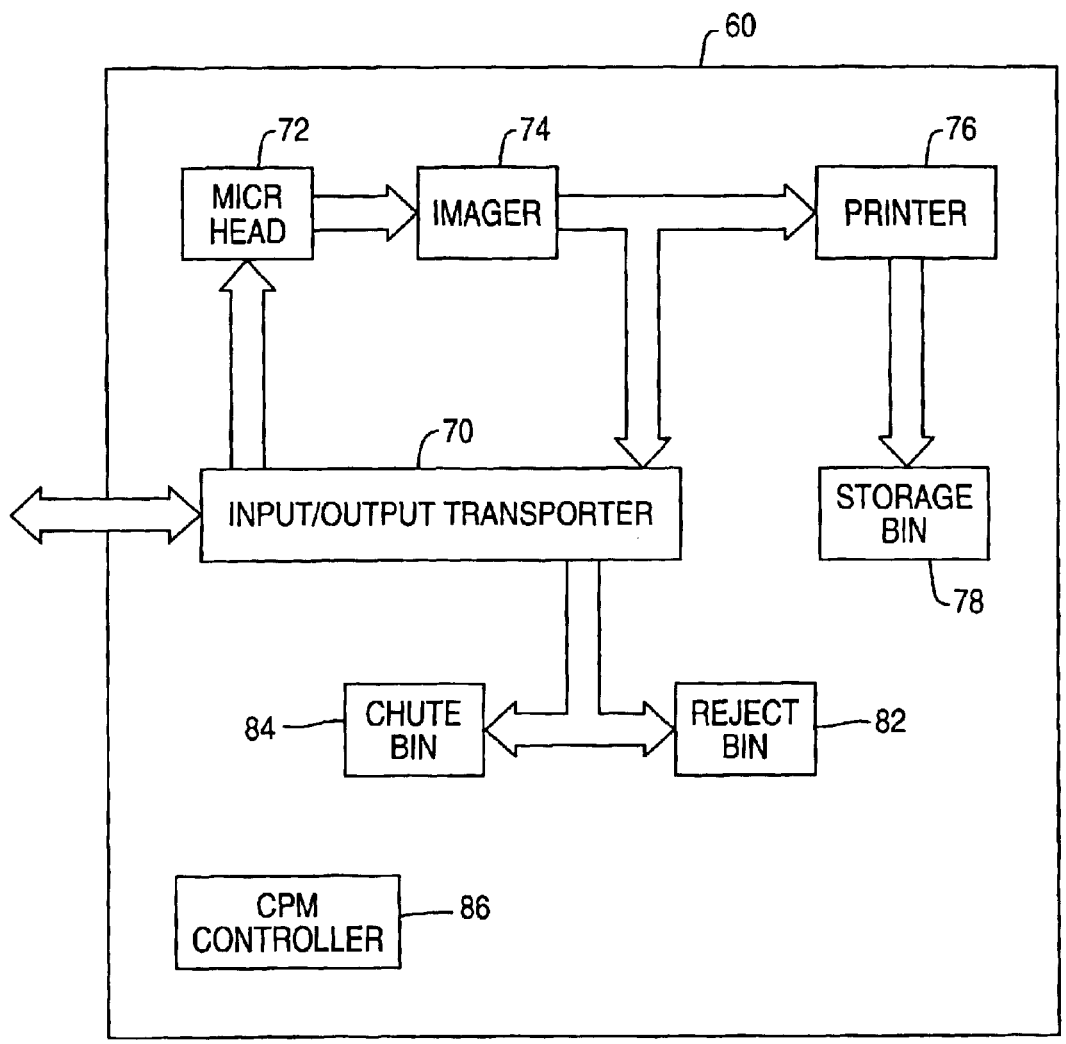
FIG. 3 is a pictorial diagram of a part (the lower dispense area) of the terminal of FIG. 1.

The check processing module (CPM) 60 will now be described with reference to FIG. 2 and FIG. 3. FIG. 2 is a simplified schematic sectional diagram (along line 2—2 in FIG. 1) showing part of the fascia 12 and lower panel 18, and the main parts of the CPM 60. FIG. 3 is a block diagram illustrating the main elements in the CPM 60.

The CPM 60 is a modified version of a conventional check processing module, such as the check processing module provided with the PERSONAS (trade mark) 5878 NCR ATM.

The CPM 60 comprises the following elements: a check input/output transport mechanism 70 including an alignment mechanism for aligning a check; a MICR head 72 for reading magnetic details on a code line of a check; an imager 74 including an upper 74a and lower 74b CCD camera for capturing an image of each side of a check (front and rear); a printer 76 for endorsing a check; and a storage bin 78 for storing processed checks. The transport mechanism 70 includes two divert gates 80a, 80b for diverting checks to either a reject bin 82 or a chute bin 84. The elements (70 to 82) are conventional and will not be described in detail herein.

The CPM 60 also includes a controller 86 for controlling the operation of the elements (70 to 80) within the CPM 60.

The chute bin 84 includes a chute 88 in the form of a steep, sloping plastics guide arranged to deliver a check from the transport mechanism 70 to the dispense area 58 using the force of gravity.

The CPM 60 also includes an entrance shutter 90 for opening and closing the check input/output slot 56, and a dispense area shutter 92 for allowing user access to the chute 88.

Figure 4:
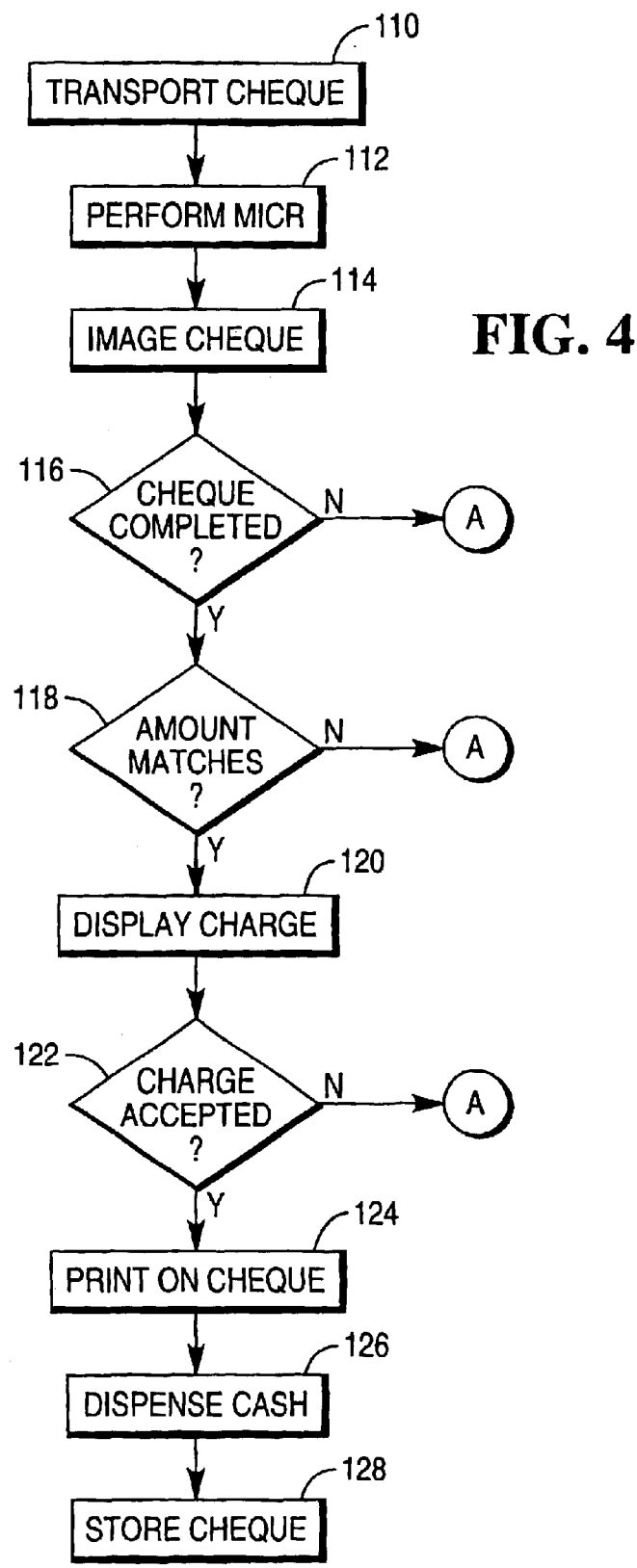
FIG. 4 is a flowchart illustrating the steps involved in a check cashing operation.

A typical transaction will now be described with reference to FIG. 4, which is a flowchart illustrating the steps involved in a check cashing transaction, and also with reference to FIGS. 1 to 3. In this transaction, a user has registered with an institution owning and operating the ATM 10, and the user has informed the institution that he receives a weekly pay check for two hundred pounds, and has received a registration card for accessing check cashing functions at the ATM 10.

Initially, the user enters the registration card into the card reader slot 52, selects "check cashing" from a list of transaction options presented on the display 36, and inserts the check to be cashed through the check input/output slot 56.

The CPM controller 30 opens the slot shutter 90 to receive the check, and transports the received check (step 110) to the MICR head 72 where a code line on the check is read (step 112).

The transport mechanism 70 then transports the check to the imager, where both sides of the check are imaged (step 114).

The ATM 10 then verifies that the check has been completed correctly (step 116). If the check is incomplete, then the CPM 60 initiates a check return operation, described below with reference to FIG. 5.

If the check is complete, then the ATM 10 verifies that the amount printed in a courtesy amount field on the check matches details provided by the user when the user registered with the institution operating the check cashing ATM (step 118). In this example, the user registered a two hundred pounds check that was received weekly, and the check being presented is made out for two hundred pounds.

Figure 5:
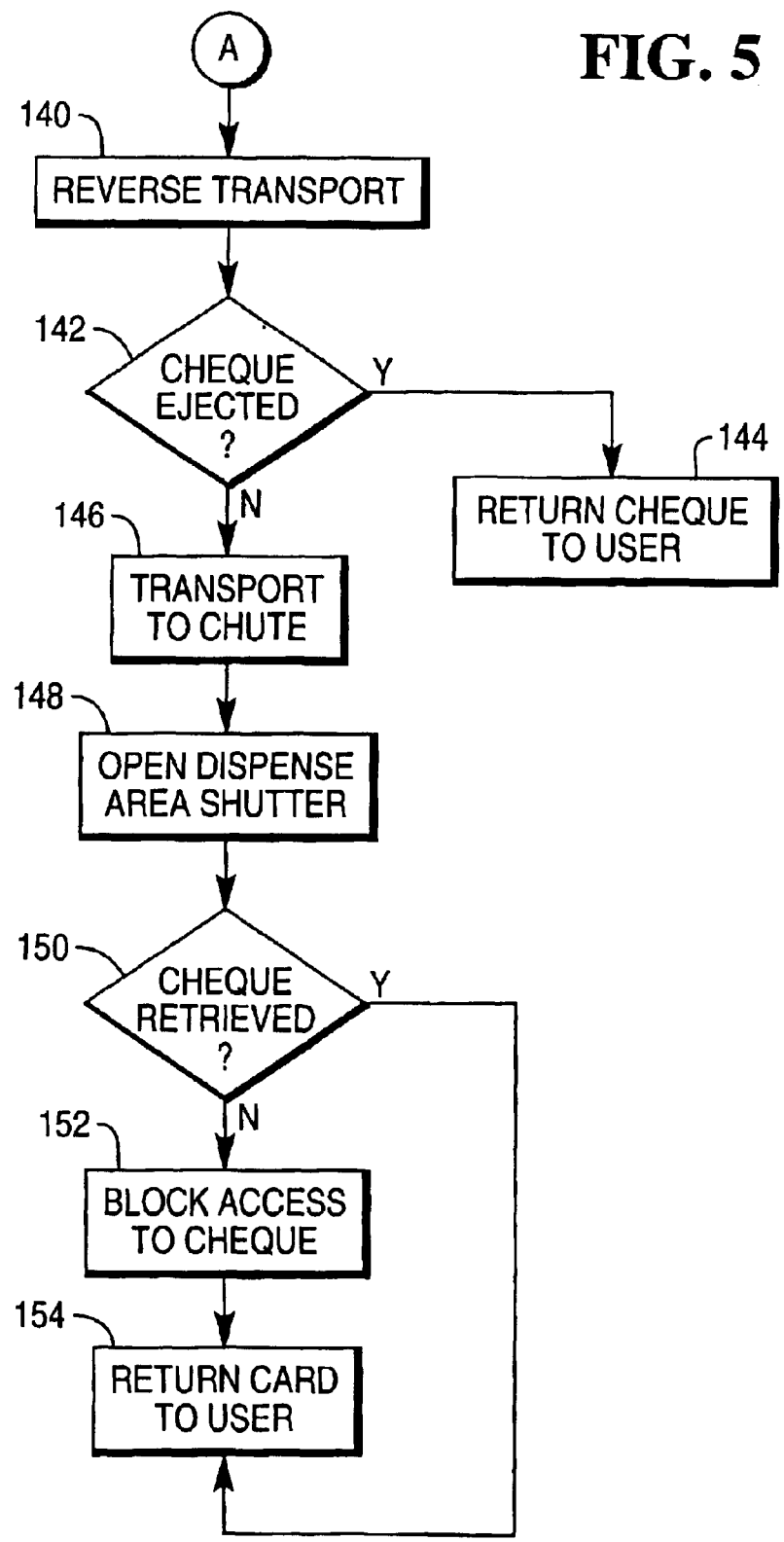
FIG. 5 is a flowchart illustrating the steps involved in a check return operation during an unsuccessful check cashing operation.

If the amounts do not match, then the CPM 60 initiates a check return operation, described below with reference to FIG. 5.

If the amounts do match, as in this example, then the ATM 10 displays the charge that will be deducted for cashing the check (step 120), in this example five pounds, and requests the user to confirm that he is willing to pay this charge to cash the check (step 122).

If the user does not wish to pay the charge, then the CPM 60 initiates a check return operation, described below with reference to FIG. 5.

If the user accepts the charge, then the CPM 60 prints endorsement data onto the check (step 124), and dispenses cash (step 126) to the value of the courtesy amount of the check minus the charge levied for cashing the check, in this example, one hundred and ninety five pounds is dispensed to the user.

The CPM 60 then transports the check to the storage bin 78 (step 128) for subsequent collection and further processing.

The check return operation will now be described with reference to FIG. 5, which is a flowchart illustrating the steps involved in attempting to return a check to a user.

In attempting to return a check, the transport mechanism initially reverses the direction of transport (step 140) to convey the check to the check input/output slot 56. The CPM 60 determines if the check has been successfully conveyed to the input/output slot 56 (step 142) using sensors (not shown) in the vicinity of the shutter 90.

If the check has been conveyed to the input/output slot 56 then the reverse transport has been successful and the check can be returned to the user (step 144) in the conventional manner, that is, by presenting the check to the user via the check input/output slot 56. The CPM may monitor the slot 56 to ensure that the check has been removed by the user, and if the user has not removed the check within a predetermined time period, the CPM may retract the check and convey the check to the reject bin 82.

If the check cannot be transported to the input/output slot 56, then the transport mechanism 70 reverses the direction of transport again so that the check is driven towards the chute (step 146). When the check reaches the chute, it leaves the transport mechanism 70 and falls down the chute 88 under force of gravity. The CPM controller 86 opens the dispense area shutter 92 (step 148) to allow the user to remove the check from the open area defined by the chute bin 84. The display 36 also informs the user that the check has been delivered to the lower dispense area 58.

A sensor (not shown) in the chute bin 84 detects if the check is present in the bin 84. If the controller 86 determines that the check has not been removed within a predetermined time period (step 150), the controller 86 may close the dispense area shutter 92 (step 152) to block access to the check until the check has been removed by an authorized person. If the check is removed by the user, then the ATM 10 returns the card to the user via the card reader slot 52 (step 154).

Various modifications may be made to the above described embodiment within the scope of the invention, for example, in other embodiments the chute may be arranged so that the guide is substantially vertical. In other embodiments, the chute may include a purge mechanism. The purge mechanism may include a trap door so that if there is a check in the dispense area that has not been removed by a user, the trap door can be opened by the CPM controller 86 to allow the check to fall into a purge bin located beneath the chute. Alternatively, the purge mechanism may be implemented by the chute being pivotable so that if there is a check in the dispense area that has not been removed by a user, the chute can be pivoted by the CPM controller 86 to allow the check to fall into a purge bin located beneath the chute. The advantage of having a purge mechanism is that an authorized person is not required to remove a check from the dispense area, thereby reducing the cost of operating the ATM 10.

In other embodiments, other documents may be deposited than checks.

What is claimed is:

1. A self-service terminal comprising:
   a fascia having a document entry/exit slot; and
   a document processing module for processing documents entered via the slot, the document processing module including a document transport mechanism for transporting the documents between the slot and a processing zone, the transport mechanism including a chute leading to a dispense area, so that if a document is to be returned to a user, the transport mechanism attempts firstly to return the document via the slot, and if that fails, the transport mechanism deposits the document into the chute to return the document to the user via the dispense area.

2. A terminal according to claim 1, wherein the entry/exit slot is located above the dispense area.

3. A terminal according to claim 1, wherein the processing zone includes a magnetic ink character recognition (MICR) reader.

4. A terminal according to claim 1, further comprising a shutter for controlling access to the dispense area and for, when in an open position, allowing the user to retrieve the document from the dispense area.

5. A terminal according to claim 1, wherein the chute includes a purge mechanism for purging the document from the dispense area to a purge bin in the event of the document not being retrieved by the user.

6. A terminal according to claim 5, wherein the purge mechanism includes a trap door through which the document falls from the dispense area to the purge bin when the trap door is opened.

7. A terminal according to claim 5, wherein the purge mechanism is implemented by the chute pivoting to deposit the document into the purge bin.

8. A document processing module comprising:
    means defining an entrance port at an upper area;
    means defining an exit port at a lower area;
    a document transport mechanism for transporting a document from the upper entrance port to a storage area; and
    a chute for delivering to the lower exit port any document which is unable to be transported properly to return the document to a user.

9. A module according to claim 8, wherein the chute includes means for purging the document from the lower exit port when the document is unretrieved from the lower exit port by the user.

10. A method according to claim 9, wherein the financial instrument comprises a check.

11. A method of cashing a financial instrument, the method comprising the steps of:
    transporting a financial instrument from an entrance slot to a processing zone;
    determining whether to accept or reject the instrument;
    dispensing cash when the instrument is accepted; and
    dropping the instrument into a chute leading to a dispense area to return the instrument to the user when the instrument is rejected.

12. A self-service terminal comprising:
    means defining a document entry/exit slot;
    means defining a document dispense area;
    a document transport mechanism for transporting a document received through the slot;
    a chute leading to the dispense area; and
    a controller for (i) controlling the transport mechanism to transport a document to the slot to return the document to a user via the slot, and (ii) controlling the transport mechanism to transport the document to the chute to return the document to the user via the dispense area when the document is unable to be returned to the user via the slot.

13. A terminal according to claim 12, wherein the document entry/exit slot is located above the document dispense area.

14. A terminal according to claim 12, further comprising a shutter for controlling access to the dispense area and for, when in an open position, allowing a user to retrieve the document from the dispense area.

15. A terminal according to claim 12, further comprising a purge bin located beneath the chute, and wherein the chute includes a purge mechanism for purging the document from the dispense area to the purge bin when the document is unretrieved from the dispense area by the user.

16. A terminal according to claim 15, wherein the purge mechanism includes a trap door through which the document falls from the dispense area to the purge bin when the trap door is opened.

17. A terminal according to claim 15, wherein the controller controls the purge mechanism to pivot the chute to a position to allow the document in the dispense area to fall into the purge bin.

18. A self-service terminal for enabling a user to cash a financial instrument, the terminal comprising:
    a cash dispenser for dispensing cash;
    means defining an entrance slot through which the user can insert the instrument to be cashed;
    means for determining whether to accept or reject the instrument;
    a transport mechanism for transporting the instrument from the entrance slot to the determining means to determine whether to accept or reject the instrument;
    means defining a dispense area through which the instrument can be returned to the user;
    a chute leading to the dispense area; and
    a controller for (i) controlling the cash dispenser to dispense cash when the instrument is accepted, and (ii) controlling the transport mechanism to transport the instrument to the chute leading to the dispense area to return the instrument to the user when the instrument is rejected.

* * * * *